United States Patent [19]

Ray, Jr. et al.

[11] 4,066,296
[45] Jan. 3, 1978

[54] TRUCK BED TILTING MECHANISM

[76] Inventors: Louis M. Ray, Jr., 6305 Pine St., Rowlett, Tex. 75088; Leo L. Pease, 511 E. Main St., Richardson, Tex. 75081; Henry C. Brown, 410 Crusader Drive, Dallas, Tex. 75217

[21] Appl. No.: 755,022

[22] Filed: Dec. 28, 1976

[51] Int. Cl.² ............................................. B60P 1/20
[52] U.S. Cl. ........................... 298/22 J; 214/DIG. 10
[58] Field of Search ............. 298/22 R, 22 AE, 22 C, 298/22 J, 22 P, 22 D, 19 R; 214/501, DIG. 10

[56] References Cited

U.S. PATENT DOCUMENTS

| | | | |
|---|---|---|---|
| 2,094,521 | 9/1937 | Biszantz | 298/22 D |
| 2,143,291 | 1/1939 | Wachter | 298/22 D |
| 3,195,956 | 7/1965 | Kou | 298/22 D |
| 3,279,854 | 10/1966 | Daubresse | 298/22 J |
| 3,809,429 | 5/1974 | Channell | 298/22 J X |

*Primary Examiner*—Frank E. Werner
*Attorney, Agent, or Firm*—Richards, Harris & Medlock

[57] ABSTRACT

A truck bed tilting mechanism is provided for use between the hauling bed and frame of a truck having a bed pivotally connected adjacent the rear of the truck frame to permit relative rotation between the hauling bed and the frame. The tilting mechanism includes a first arm pivotally connected at one of its ends to the truck frame and extending forwardly from the frame. A second arm is pivotally connected at one of its ends to the truck bed adjacent the forward end of the bed and extending rearwardly from the truck bed. A third arm is pivotally connected between the end of the first arm remote from the frame and a point intermediate of the ends of the second arm. A fourth arm is pivotally connected between the end of the second arm remote from the hauling bed and a point intermediate of the end of the first arm. A variable length actuator arm is interconnected between the first and second arms at points intermediate of the ends of the first and second arms. The length of the actuator arm may be varied to unfold and collapse the tilting mechanism which results in the tilting of the truck bed relative to the frame. In accordance with one embodiment of the invention, the third and fourth arms are connected to the first and second arms to form a parallelogram. The actuator arm is connected to the first arm at the point of connection of the fourth arm to the first arm. The opposite end of the actuator arm is connected to the second arm at the point the third arm is connected to the second arm.

16 Claims, 6 Drawing Figures

TRUCK BED TILTING MECHANISM

BACKGROUND OF THE INVENTION

1. Field of the Invention

This invention relates to an apparatus for converting a fixed bed pickup truck to a tilting bed truck, and more particularly, to a geometrically improved tilting mechanism for converting a fixed bed pickup truck to a tilting bed truck such that the relationship of the pickup bed to the passenger cab remains unchanged after the conversion.

2. Prior Art

The advantages of having a truck with the capability of selectively tilting the truck bed or hauling box to facilitate removal of materials transported thereon has resulted in a number of systems for providing such a feature. The systems heretofore used have been primarily of two types. The first is characterized by a truck bed hinged at the rear of the truck frame and tilted by the actuation of a hydraulic ram or other variable length arm connected directly between the forward end of the truck bed and truck frame. In order to accommodate the lifting ram and permit the truck bed to be positioned adjacent the truck frame when in the horizontal position, the lifting ram in these systems is normally exposed either within or without of the hauling bed, thus introducing the substantial disadvantage of having the lifting ram in an exposed position. Alternately, the lifting ram is positioned below the truck bed with the bed substantially raised above its normal designed position or with the ram so positioned as to introduce very inefficient leverage as it functions to tilt the truck bed.

A second type of lifting mechanism has been employed wherein a hydraulic ram is used to extend a multibar linkage consisting generally of two or three interconnected members. By unfolding the linkage, the truck bed is raised to the tilted position. Examples of this type of system are found in U.S. Pat. No. 3,617,090, issued to Samuel E. Huffman, and U.S. Pat. No. 3,043,629, issued to D. H. Schlueter, et al. In each of these configurations, the truck bed is tilted by extending the upper arm by use of a hydraulic ram acting between the lower arm and the upper arm.

Many of the prior art units have generally altered the relationship between the truck bed and the passenger cab thereby destroying the asthetic appearance of the vehicle. Moreover, the prior art systems have failed to disclose a simple conversion system which does not require extensive alteration to the truck frame or bed and which does not effect either vehicle structural or operating components such as the drive shaft, muffler and other original parts in converting the truck from a fixed bed to a tilting bed vehicle. While the multibar lift mechanisms introduce the advantage of the mechanism nesting below the truck bed, these tilting mechanisms fail to make the most advantageous use of unused space between the truck bed and truck frame which exists on many trucks now on the market.

Moreover, many of these units do not permit the conversion from a fixed bed to a tilting bed truck without alterations to the truck, and in many cases, the units can only be used, even with modifications to the truck, on a limited number of truck makes and models.

SUMMARY OF THE INVENTION

The present invention provides a system for overcoming many of the disadvantages found in the prior art and specifically provides a system for converting a fixed bed to a tilting bed truck without any substantial alterations to the vehicle frame or truck bed. Further, the present system is readily adaptable to many types of trucks without regard to the particular configuration of the frame or truck bed and without requiring alteration or removal of original structural or operational components. Further, the present system provides a conversion system wherein the relationship between the truck bed and passenger cab and frame are unchanged by the conversion while making efficient use of the available space between the hauling bed and truck frame with a more efficient geometric lifting configuration than those found in prior art systems.

In accordance with the present invention, a truck bed tilting mechanism is provided for use between the hauling bed and frame of a truck having a bed pivotally connected adjacent the rear of the truck frame to permit relative rotation between the hauling bed and the frame. The tilting mechanism includes a first arm pivotally connected at one of its ends to the truck frame and extending forwardly from the frame. A second arm is pivotally connected at one of its ends to the truck bed adjacent the forward end of the bed and extending rearwardly from the truck bed. A third arm is pivotally connected between the end of the first arm remote from the frame and a point intermediate of the ends of the second arm. A fourth arm is pivotally connected between the end of the second arm remote from the hauling bed and a point intermediate of the end of the first arm. A variable length actuator arm is interconnected between the first and second arms at points intermediate of the ends of the first and second arms. The length of the actuator arm may be varied to unfold and collapse the tilting mechanism which results in the tilting of the truck bed relative to the frame.

In accordance with one embodiment of the invention, the third and fourth arms are connected to the first and second arms to form a parallelogram arrangement. Moreover, the variable length actuator arm may be connected to the first arm at the point of connection of the fourth arm to the first arm. The opposite end of the actuator arm may be connected to the second arm at the point the third arm is connected to the second arm.

In accordance with still another embodiment of the invention, each of the arms include spaced lever members with the third and fourth lever members being attached to the inside faces of the first and second lever members. As a result of this arrangement, and particularly where the lever members are made from plate material, the tilting mechanism may be nested closely together in its folded position such that the intermediate third and fourth lever members which connected the first and second lever members are completely within the first and second members. Alternatively, the third and fourth lever members may be attached to the outside faces of the first or second lever members as desired.

In accordance with still another embodiment of the invention, the actuator arm includes a cylinder having one end connected to the second arm and a piston arm moveable within the cylinder and having a portion extending therefrom and connected to the first arm. An orifice valve is mounted on the cylinder for receiving fluid into the cylinder to extend the piston arm for unfolding the tilt mechanism. As a result, the truck bed is tilted relative to the truck frame. The orifice valve further controls the discharge of fluid from the cylinder to retract the piston arm and nest the tilt mechanism as the truck bed is lowered. The valve prevents the sudden discharge of fluid from the cylinder thereby preventing sudden dropping of the truck bed.

The present invention provides a very compact structure readily positionable between the truck bed and frame of many presently manufactured trucks without the need for alteration of any of the operating or structural components and without altering the relationship between the truck bed and the passenger cab compartment. Because of the structure of the present mechanism, the lift mechanism may be made relatively narrow without sacrificing lateral stability when used with relatively small trucks such as those made outside the United States and the lighter trucks made domestically. Moreover, the resulting compact design has been extremely well suited for making the best possible use of the unused available space between the truck bed and frame in smaller trucks.

Moreover, the present arrangement provides a tilting mechanism where the point of connection of the mechanism to the underside of the truck bed is to the forward end of the bed remote from the hinge point between the bed and the frame. As a result, the mechanical advantage provided by the lift mechanism is greatly improved over prior art systems.

Additionally, in the embodiment where the linkages making up the tilt mechanism are made from plate stock material with each linkage having its major plane vertical and parallel one to the other, the mechanism can be constructed with a relatively narrow configuration while still maintaining the required structural moment of inertia. Moreover, the linkages may be designed to nest relative to each other thereby permitting the mechanism to be used in the limited unused space between the truck bed and the frame.

DESCRIPTION OF THE DRAWINGS

For a more complete understanding of the present invention, and for further details and advantages thereof, reference is now made to the following description taken in conjunction with the accompanying drawings in which.

DESCRIPTION OF THE PREFERRED EMBODIMENTS

Figure 1:
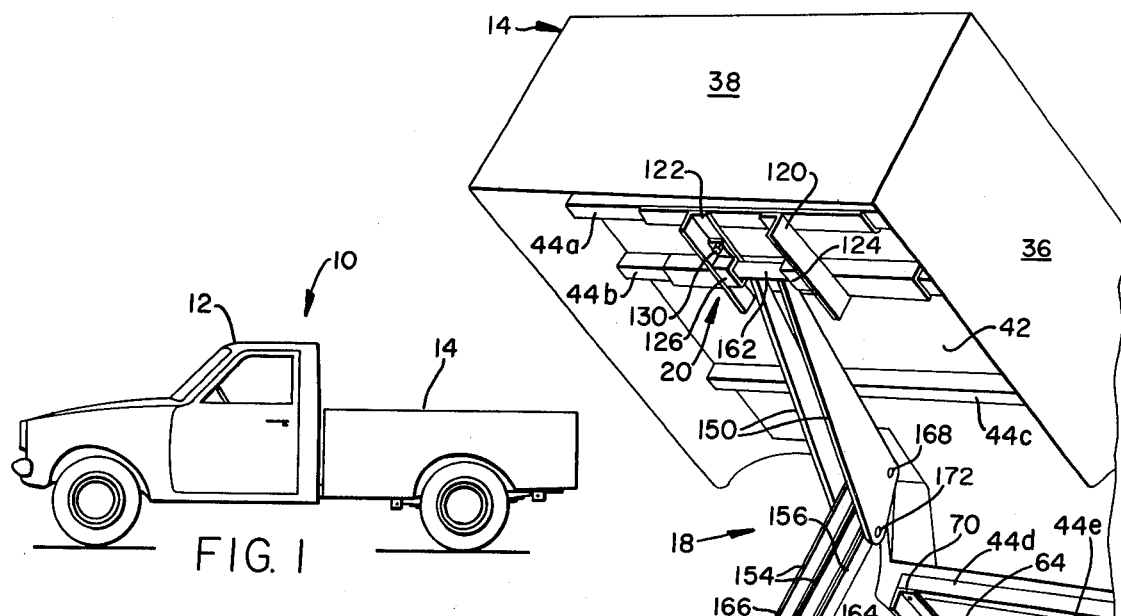
FIG. 1 illustrates a pickup truck embodying the present invention with the truck bed in the horizontal position.

FIG. 1 illustrates a standard pickup truck embodying the present invention. The truck, identified generally by the reference numeral 10, comprises a passenger cab 12 and a rear hauling bed or box 14. Referring to FIG. 1, it is seen that the conversion of a fixed bed truck to a tilting bed truck in accordance with the present invention does not alter the relationship of the truck bed 14 to the passenger cab 12 when the bed is in the horizontal position.

Figure 2:
FIG. 2 is a perspective view of a pickup truck embodying the present invention wherein the truck bed is tilted rearwardly.
Figure 3:
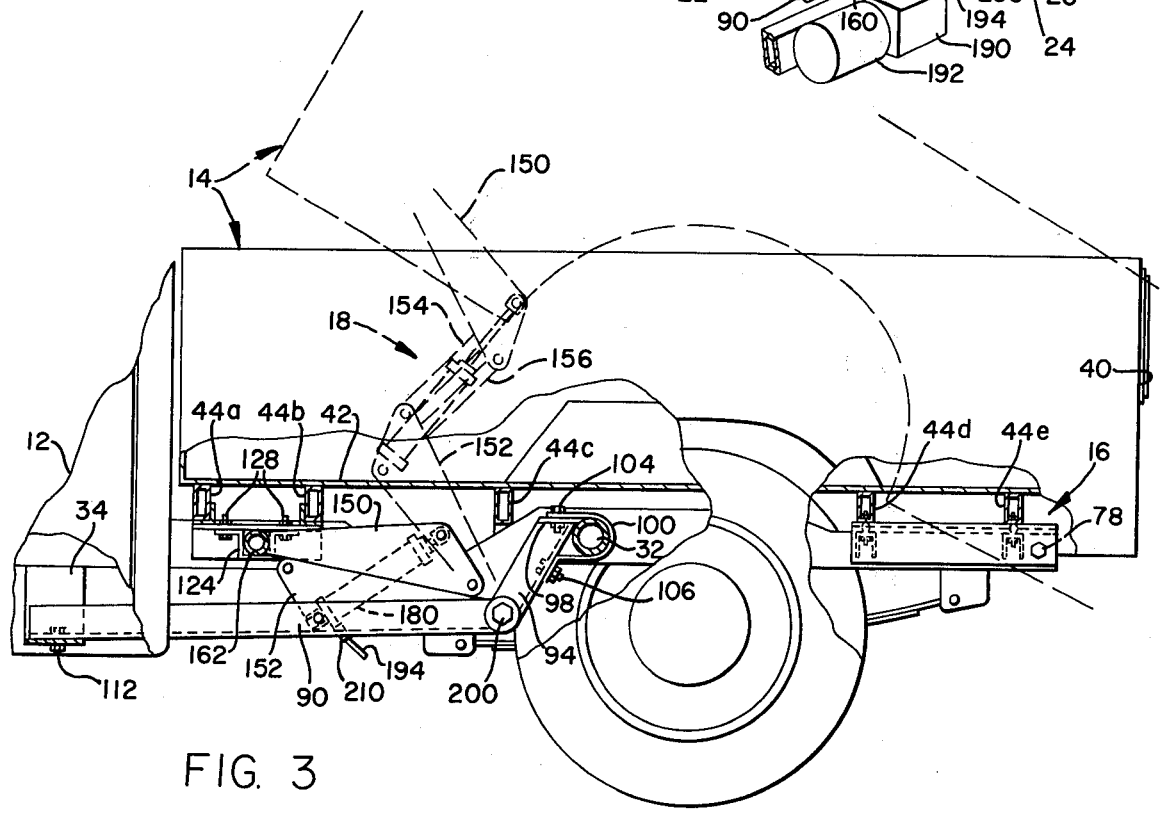
FIG. 3 is a side plane view partially broken away to show the tilt mechanism and its attachment between the truck bed and truck frame with the truck bed shown in both the horizontal and tilted positions.
Figure 4:
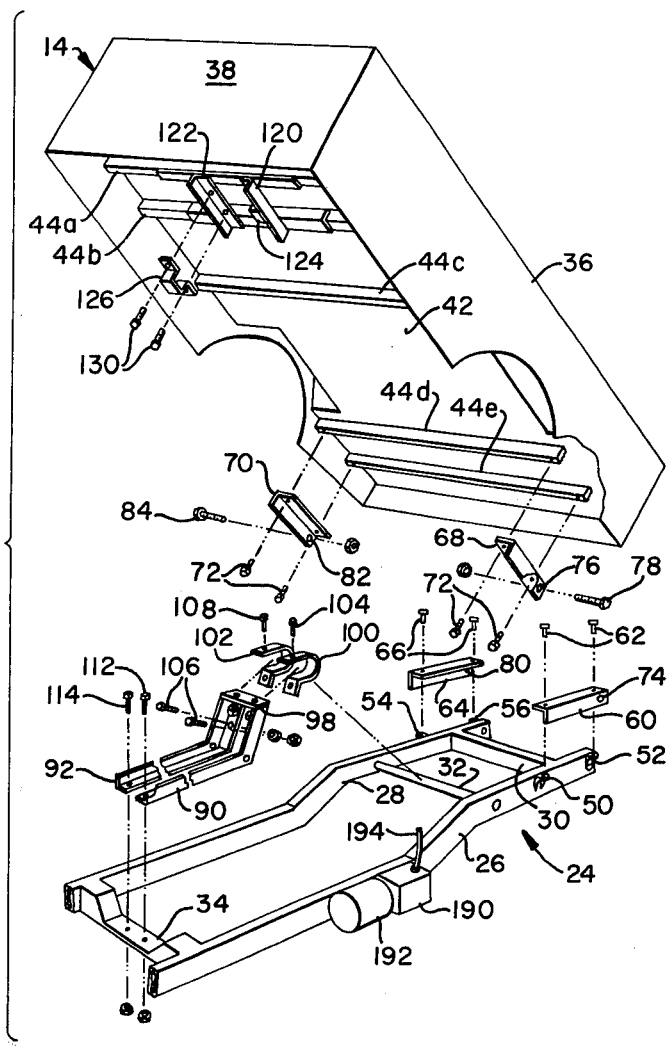
FIG. 4 is a perspective view of modifications to the truck bed and frame for application of the present invention.

Referring to FIGS. 2 and 3, the truck bed 14 is tilted rearwardly about hinge assemblies 16 by lifting mechanism 18 attached between a frame structure 20 attached to the underside of bed 14 and a lower frame structure 22 attached to chassis 24 of truck 10. Referring to FIGS. 2, 3 and 4, truck chassis 24 includes longitudinal box frames 26 and 28 joined by transverse frame members 30, 32 and 34. Truck bed 14 includes sidewalls 36, a front wall 38, a rear gate section 40 and a floor 42. Floor 42 is supported by transverse floor supports 44a–44e attached to floor 42 and walls 36 and 38 by suitable means, such as by welding. Frame attachment fitting 50, 52, 54 and 56 are attached to frames 26. These fittings normally mate with transverse floor supports 44 to join the truck bed to the chassis.

In converting a fixed bed truck to the tilting bed vehicle of the present invention, truck bed 14 is detached from chassis 24 by removing all fasteners and other means of attachment between the bed and the chassis. Thereafter, angle 60 is attached to fittings 50 and 52 by suitable means such as fasteners 62, and angle 64 is attached to frame attachment fittings 54 and 56 by suitable means such as fasteners 66. Upper hinge angles 68 and 70 are attached to transverse floor supports 44b and 44e by suitable fasteners such as bolts 72. Angles 68 and 70 are spaced such that their downwardly extending vertical flanges are positioned adjacent the vertical flanges of angles 60 and 64 attached to chassis 24 when bed 14 is positioned on chassis 24. Apertures 74 and 76 are formed in angles 60 and 68, respectively, and receive a suitable pin such as bolt 78 to form a hinge therebetween. Likewise, angles 64 and 70 are formed with apertures 80 and 82, respectively, and receive a pin such as bolt 84 therein to form a hinge therebetween. As a result of this arrangement, truck bed 14 is hinged from chassis 24.

As can be seen in FIGS. 2, 3 and 4, lower frame 22 includes two horizontal angles 90 and 92 connected to upwardly extending angles 94 and 96 connected by a top plate 98. These elements are each rigidly attached one to the other such as by welding. Angles 94 and 96 and top plate 98 is attached to transverse frame member 32 by U-clamps 100 and 102. U-clamp 100 is attached to top plate 98 and angle 94 by bolts 104 and 106, respectively. U-clamp 102 is likewise connected to top plate 98 and angle 92 by bolts 108 and 110. The forward end of angles 90 and 92 are joined to transverse frame member 34 by bolts 112 and 114 (FIGS. 3 and 4).

The underside of truck bed 14 is modified to receive the upper end of lift mechanism 18 by the attachment of angles 120 and 122 to transverse floor supports 44a and 44b by being welded or bolted thereto. A pair of U-brackets 124 and 126 are attached by bolts 128 and 130 to angles 120 and 122, respectively, and receive the upper end of lift mechanism 18 as will hereinafter be described in greater detail.

Figure 5:
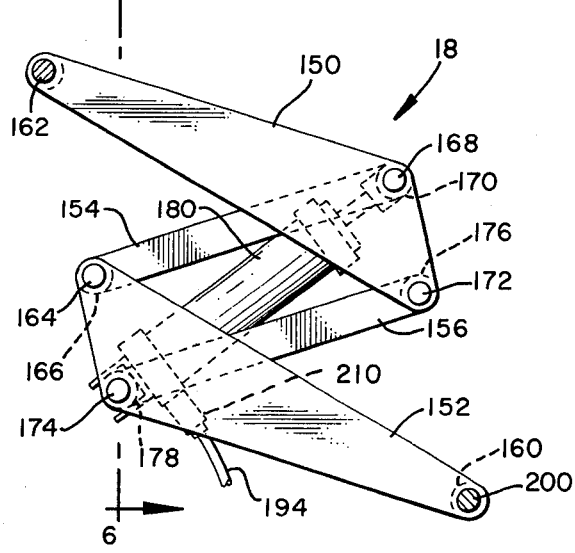
FIG. 5 illustrates a more detailed side plane view of the tilt mechanism used in the present invention, showing the mechanism in the retracted and partially extended positions.

Lift mechanism 18 includes lever arms 150 and 152 connected by arms 154 and 156. In a preferred embodiment of the invention, lift mechanism 18 is a sub-assembly as shown in FIG. 5 which is attached between the truck bed and chassis. In the preferred embodiment, arms 150, 152, 154 and 156 each consist of a pair of parallel arms. Arms 152 are attached at their lower ends by a sleeve member 160 while the upper end of arms 150 are also connected in a spaced relation by a cylinder 162. Arms 154 are pivotally connected at their lower end to the end of arms 152 remote from sleeve 160. A pin 164 makes the pivotal connection and a sleeve member 166 maintains this end of lever arms 152 in a spaced relation and likewise separates lever arms 154 positioning them adjacent to lever arms 152. The opposite ends of lever arm 154 are connected to a point intermediate of the ends of lever arm 150. This connection is also a pivotal connection about pin 168. A sleeve 170 is positioned between lever arms 154 and about pin 168 and maintains an equal separation between lever arms 154 positioning them adjacent lever arms 150. Lever arms 156 are similarly attached between lever arms 150 and 152. The upper end of lever arms 156 are connected to the end of lever arms 150 remote from cylinder member 162 by a pin 172 and are pivotally attached at their opposite end to lever arms 152 intermediate of the ends of lever arms 152 by a pin 174. Sleeve members 176 and 178 are received around pins 172 and 174 to maintain lever arms 156 in a spaced relationship one from the other and adjacent lever arms 150 and 152, respectively.

In a preferred embodiment of the invention, a hydraulic cylinder 180 is connected at its opposite ends to sleeves 170 and 178. Alternatively, cylinder 180 may be attached at points removed from the points of attachment of lever arms 154 and 156 to lever arms 150 and 152 but intermediate of the ends of arms 150 and 152. Cylinder 180 is supplied hydraulic fluid from a pump 190 driven by electric motor 192. The hydraulic fluid is supplied to cylinder 180 through hydraulic line 194 and a suitable valve 196.

Figure 6:
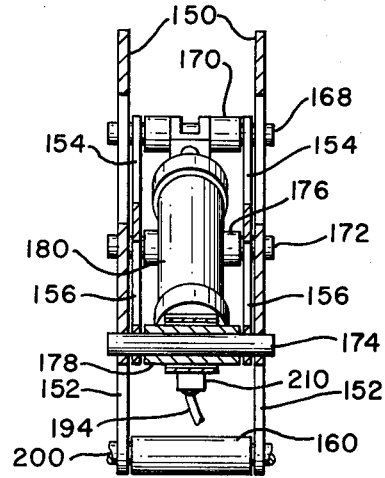
FIG. 6 is a section view taken along lines 6—6 of FIG. 5 and looking in the direction of the arrows.

In a preferred embodiment of the invention, lever arms 154 and 156 are of equal length and are equally spaced at their points of connection to lever arms 150 and 152. In this embodiment, arms 150, 152, 154 and 156 form a parallelogram. Moreover, the lever arms 150 through 154 are made from flat stock material and thereby provide an arrangement which may be folded in a very compact nested position when the lift mechanism is in the collapsed position. Referring to FIG. 6, it may be seen that in the embodiment where arms 150–154 are flat stock material, lever arms 154 and 156 may be completely nested within and immediately adjacent to lever arms 150 and 152. Thus, the lift mechanism may be relatively narrow and therefore positionable within narrow unused space between the hauling bed and truck frame of many trucks.

Lift mechanism 18 is attached to lower frame 22 by insertion of a bolt 200 through angles 90 an 92 and sleeve 160 fitted at the lower end of arm 152. This arrangement provides a hinged connection of lift mechanism 18 from lower frame support 22. Lift mechanism 18 is attached at the upper end of lever arms 150 by clamping cylinder 162 against angles 120 and 122 with U-brackets 124 and 126. U-brackets 124 and 126 provide adequate clearance to permit the rotation of cylinder 162 therein.

When the operator of the truck wishes to tilt hauling bed 14, motor 192 is energized to actuate pump 190 to direct hydraulic fluid through line 194 into hydraulic cylinder 180 causing the hydraulic cylinder to be extended. The extension of cylinder 180 forces the unfolding of arms 150 and the simultaneous rotation of arms 152, 154 and 156 upwardly. This movement results in the tilting of bed 14. It is noted that as a result of the interconnection of arms 150, 152, 154 and 156, the upper end of lever arms 150 connecting the lift mechanism to hauling bed 14 is to the forward end of hauling bed 14. As a result, the force acting against lever arm 150 and the lift mechanism 18 is substantially less than that force in other systems where the point of connection between the hauling bed and lift mechanism is more rearward. This feature of the invention is highly significant in that the overall loading on the lift mechanism is substantially lowered. Moreover, it has been found that the lift mechanism of the present invention provides a linkage which can be unfolded to provide the required extended height necessary to tilt the truck bed through an extended rotation angle. Therefore, the particular geometric arrangement of the present invention substantially reduces the load and stress experienced by the unit with a given truck payload, and thereby permits the use of smaller structural components. This is all accomplished by the present invention with a relatively compact narrow lift mechanism which can be mounted within the available space between the truck bed and frame without interferring with the structural components located below the bed.

As cylinder 180 is extended, and the lifting mechanism 18 unfolded, the bed is tilted to facilitate unloading cargo therein. When the bed has reached a desired angle of rotation, electric motor 192 is de-energized to arrest the movement of the bed. The system may also be provided with an automatic shutoff mechanism which automatically stops the movement of the bed at a preselected angle of tilt to prevent over travel of the lift mechanism.

Lowering of the tilt bed is substantially the reverse of the lift cycle wherein motor 192 is energized to permit the release of hydraulic fluids from cylinder 180 through line 194 by a valve mechanism responsive to the system control switches. Hydraulic fluid released from cylinder 180 is stored in a reservoir adjacent motor 192. As hydraulic fluid is released from cylinder 180, the cylinder is retracted under the load of truck bed 14 and arms 150, 152, 154 and 156 fold into a nesting position under the truck bed as illustrated in FIGS. 3 and 4. It is again noted that as the lift mechanism is retracted below the truck bed, the load of the bed is supported by the connection of lift arm 150 to the underside of the lift bed at a point substantially to the forward end of the bed. This provides an improved leverage point and thereby lowers the load applied to the lift mechanism for any given payload or truck bed weight.

A safety feature is designed into the lift mechanism by use of an orifice valve 210 at the point of connection of line 194 to cylinder 180. Orifice valve 210 is designed to restrict the discharge of fluid from cylinder 180 to assure a control rate of contraction of the cylinder and thus a moderate rate of decent of truck bed 14. Thus, a failure in line 194 will not result in the truck bed falling to its horizontal position, but rather the truck bed will lower gradually as in a normal retraction.

Thus, the present invention provides a system for converting a fixed bed truck to a tilting bed truck without requiring substantial alterations to the vehicle frame or to the truck bed. The conversion system is so designed as to not alter the relationship between the truck bed and passenger cab and frame when adapted to the vehicle by providing a geometrically efficient lift system which can be mounted in unused spaced between the truck bed and frame. Thus, the present system may be adapted to trucks without modification of the truck's operational or structural components. More importantly, the present system provides a lift mechanism which is relatively narrow in dimension with the point of connection between the lift mechanism and the truck bed substantially to the forward end of the truck bed thereby providing better leverage in lifting the truck bed about the hinge point at the rear of the truck bed. Further, the present lift mechanism may be made from flat plate material having a final configuration which nests in a compact unit below the truck bed when the bed is in the lowered horizontal position.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of part and elements as fall within the scope of the appended claims.

What is claimed is:

1. A truck bed tilting mechanism for use between the hauling bed and frame of a truck having the bed pivotally connected adjacent the rear of the frame to permit relative rotation between the hauling bed and the frame, said mechanism comprising:
   a first arm pivotally connected at one of its ends to the truck frame and extending forwardly from the frame;
   a second arm pivotally connected at one of its ends to the truck bed adjacent the forward end thereof and extending rearwardly from the truck bed;
   a third arm pivotally connected between the end of said first arm remote from the frame and a point intermediate of the ends of said second arm;
   a fourth arm pivotally connected between the end of said second arm remote from the hauling bed and a point intermediate of the ends of said first arm;
   a variable length actuator arm interconnected between said first and second arms at points intermediate of the ends of said first and second arms; and
   means for varying the length of said actuator arms for selectively tilting the truck bed.

2. The mechanism of claim 1 wherein said third and fourth arms are connected to said first and second arms to form a parallelogram.

3. The mechanism of claim 1 wherein said variable length actuator arm is connected to said first arm at the point of connection of said fourth arm to said first arm and wherein the opposite end of said actuator arm is connected to said second arm at the point said third arm is connected to said second arm.

4. The mechanism of claim 1 wherein said first arm includes spaced first lever members, said second arm includes a pair of spaced second lever members, said third arm includes a pair of spaced third lever members and said fourth arm includes a pair of spaced fourth lever members,
   means for pivotally attaching said pair of third lever members to the inside of said second lever members at one end thereof and to the inside of said first lever members at the opposite end thereof,
   means for attaching said pair of fourth lever members to the inside of said second lever members at one end thereof and on the inside of said pair of lever members on the opposite end thereof.

5. The mechanism of claim 4 wherein said first, second, third and fourth lever members are composed of plate material such that said mechanism may nest closely together in its folded position.

6. The mechanism of claim 5 wherein said actuator arm comprises:
   a cylinder having one end connected to said second arm,
   a piston arm movable within said cylinder and having a portion extending therefrom and connected to said first arm,
   an orifice valve mounted on said cylinder for receiving fluid into said cylinder to extend said piston arm and said mechanism to tilt the truck bed and for controlling the discharge of fluid from said cylinder to retract said piston arm to nest said mechanism thereby lowering the truck bed, said valve preventing the sudden discharge of fluid from said cylinder thereby preventing sudden dropping of the truck bed.

7. A truck bed tilting apparatus for use between the hauling bed and frame of a truck having the bed pivotally connected adjacent the rear of the frame to permit relative rotation between the hauling bed and the frame, said apparatus comprising:
   four rigid bars jointed in a parallelogram form having a first and second pair of parallel arms, said first pair of parallel arms having an extension beyond the parallelogram with the end of one of said extensions being pivotally connected to the hauling bed and the end of the extension of the second arm of said pair to be pivotally connected to the truck frame,
   a variable length actuator arm interconnected between the extension bearing pair of parallel arms, said actuator arm being connected to the arms of said first pair intermediate of the ends thereof,
   means for selectively extending said actuator arm to vary the geometry of the parallelogram form thereby tilting the truck bed.

8. The apparatus of claim 7 wherein each of said bars includes a pair of spaced parallel lever members.

9. The apparatus of claim 8 wherein said rigid bars are formed of plate material with the major plane of each bar being parallel one to the other such that said apparatus may nest closely together in the folded position.

10. A truck bed tilting mechanism for use between the hauling bed and frame of a truck having the bed pivotally connected at its rearward end adjacent the rear of the frame to permit relative rotation between the hauling bed and the frame, the mechanism comprising:
    a first arm pivotally connected at one of its ends to the frame and extending forwardly from the frame;
    a second arm pivotally connected at one of its ends to the underside of the truck bed adjacent the forward end thereof and extending rearwardly from the truck bed toward the frame;
    third and fourth arms pivotally interconnected between said first and second arms, said third and fourth arms being connected to said first arm at a distance one from the other equal to the distance between the connection of said third and fourth arms to said second arm, whereby said third and fourth arm are aligned parallel one to the other; and
    a variable length actuator arm interconnected between said first and second arms for exerting a force therebetween to raise the tilting mechanism to tilt the hauling bed rearwardly relative to the truck frame.

11. The mechanism of claim 10 wherein said third arm is pivotally connected between the end of said first arm remote from the frame and a point intermediate of the ends of said second arm, and wherein said fourth arm is pivotally connected between the end of said second arm remote from the truck bed and a point intermediate of the ends of said first arm and wherein said variable length actuator arm is connected to said first arm at the point of connection of said fourth arm to said first arm and wherein the opposite end of said actuator arm is connected to said second arm at the point said third arm is connected to said second arm.

12. The mechanism of claim 10 wherein said first arm includes a pair of spaced first lever members, said second arm includes a pair of spaced second lever members, said third arm includes a pair of spaced third lever members and said fourth arm includes a pair of spaced fourth lever members, means for pivotally attaching said pair of third lever members to the inside of said second lever members at one end thereof and to the outside of said first lever members at the opposite end thereof, means for attaching said pair of fourth lever members to the inside of said second lever members at one end thereof and on the outside of said pair of lever members on the opposite end thereof.

13. The mechanism of claim 12 wherein said first, second, third and fourth lever members are composed of plate material such that said mechanism may nest closely together in a folded position.

14. The mechanism of claim 10 wherein said first arm includes a pair of spaced first lever members, said second arm includes a pair of spaced second lever members, said third arm includes a pair of spaced third lever members and said fourth arm includes a pair of spaced fourth lever members, means for pivotally attaching said pair of third lever members to the inside of said second lever members at one end thereof and to the inside of said first lever members at the opposite end thereof, means for attaching said pair of fourth lever members to the inside of said second lever members at one end thereof and on the inside of said pair of lever members on the opposite end thereof.

15. The mechanism of claim 14 wherein said first, second, third and fourth lever members are composed of plate material such that said mechanism may nest closely together in a folded position.

16. The mechanism of claim 10 wherein said third and fourth arms are equal length between the points of connection of said arms to said first and second arms thereby forming a parallelogram by the interconnection of said first, second, third and fourth arms.

* * * * *